(12) United States Patent
Aizman

(10) Patent No.: US 8,316,276 B2
(45) Date of Patent: Nov. 20, 2012

(54) UPPER LAYER PROTOCOL (ULP) OFFLOADING FOR INTERNET SMALL COMPUTER SYSTEM INTERFACE (ISCSI) WITHOUT TCP OFFLOAD ENGINE (TOE)

(75) Inventor: Alexander Aizman, Mountain View, CA (US)

(73) Assignee: Hicamp Systems, Inc., Menlo Park, CA (US)

( * ) Notice: Subject to any disclaimer, the term of this patent is extended or adjusted under 35 U.S.C. 154(b) by 1112 days.

(21) Appl. No.: 12/137,919

(22) Filed: Jun. 12, 2008

(65) Prior Publication Data

US 2009/0183057 A1  Jul. 16, 2009

Related U.S. Application Data

(60) Provisional application No. 61/011,090, filed on Jan. 15, 2008.

(51) Int. Cl.
*H03M 13/00* (2006.01)
*G06F 7/02* (2006.01)
(52) U.S. Cl. ...................................................... 714/758
(58) Field of Classification Search .......... 714/748–751, 714/758, 701, 707–708, 746, 799, 821
See application file for complete search history.

(56) References Cited

U.S. PATENT DOCUMENTS

| 7,249,306 B2* | 7/2007 | Chen ............................... 714/758 |
| 7,389,462 B1* | 6/2008 | Wang et al. .................... 714/748 |
| 2004/0010545 A1 | 1/2004 | Pandya |
| 2004/0049580 A1 | 3/2004 | Boyd et al. |
| 2005/0281262 A1 | 12/2005 | Zur et al. |
| 2006/0015651 A1 | 1/2006 | Freimuth et al. |
| 2006/0056435 A1 | 3/2006 | Biran et al. |
| 2006/0095567 A1 | 5/2006 | Biran et al. |
| 2006/0165084 A1 | 7/2006 | Makhervaks et al. |
| 2006/0168091 A1 | 7/2006 | Makhervaks et al. |
| 2006/0168286 A1 | 7/2006 | Makhervaks et al. |
| 2006/0235977 A1 | 10/2006 | Wunderlich et al. |
| 2006/0259644 A1 | 11/2006 | Boyd et al. |
| 2007/0022226 A1 | 1/2007 | Wu et al. |
| 2007/0156974 A1 | 7/2007 | Haynes, Jr. et al. |

OTHER PUBLICATIONS

Chadalapaka, M., et al., "A Study of iSCSI Extensions for RDMA (iSER)," Proceedings of the ACM SIGCOMM 2003 Workshops. Aug. 2003, pp. 209-219.
Sarkar, P., et al. "Storage over IP: When Does Hardware Support Help?," Proceedings of FAST 2003: 2nd USENIX Conference on File and Storage Technologies, San Francisco, CA, Mar. 31-Apr. 2, 2003, pp. 231-244.

* cited by examiner

*Primary Examiner* — Shelly A Chase
(74) *Attorney, Agent, or Firm* — Van Pelt, Yi & James LLP

(57) ABSTRACT

An Upper Layer Protocol (ULP) offload engine system, method and associated data structure are provided for performing protocol offloads without requiring a Transmission Control Protocol (TCP) offload engine (TOE). In an embodiment, the ULP offload engine provides Internet Small Computer System Interface (iSCSI) offload services.

62 Claims, 9 Drawing Sheets

UPPER LAYER PROTOCOL (ULP) OFFLOADING FOR INTERNET SMALL COMPUTER SYSTEM INTERFACE (ISCSI) WITHOUT TCP OFFLOAD ENGINE (TOE)

CROSS-REFERENCE TO RELATED APPLICATION

This Application is the U.S. Non-Provisional Patent Application of U.S. Provisional Patent Application No. 61/011,090 filed on Jan. 15, 2008, entitled "Offloading iSCSI and RDMA without TOE" the priority of which is hereby claimed, and the entirety of which is incorporated herein by this reference.

FIELD OF THE INVENTION

The present invention relates generally to networking systems, methods and architectures, and specifically to accessing remote block storage over the Internet via iSCSI.

BACKGROUND OF THE INVENTION

Internet Small Computer System Interface (iSCSI) is a prevalent method of connecting to remote block storage over the Internet. By carrying SCSI commands over IP networks, iSCSI is used to facilitate access to remote storage.

As far as TCP is concerned, iSCSI is an Upper Layer Protocols (ULPs). In the context of the present application, the terms iSCSI and ULP are used interchangeably; however, methods and mechanisms described herein are applicable to other ULPs, including RDMA (iWARP) and Message Passing Interface (MPI). A ULP system, method and associated data structure are provided for offloading CPU and memory intensive operation from the receiving host. After a TCP segment is received, a corresponding per-connection control structure is identified. That control structure describes the state of the receive side of the ULP connection. Further, the combination of control structure and the arrived TCP segment's data and header is used to perform receive ULP processing, including calculation and checking of CRC, and direct data placement of ULP data into application buffers. In the case of iSCSI, the combination of a control structure and the arrived TCP segment's data and header is used to perform receive iSCSI processing, including calculation and validation of iSCSI header digest and data digest, and direct placement of iSCSI data into SCSI buffers associated with the original SCSI command.

iSCSI is a Layer 5 protocol that uses TCP to reliably transport iSCSI Protocol Data Units (PDUs) over IP network. iSCSI operation, especially at 10GE speeds, incurs a heavy price on the host processing, both in terms of host CPU utilization and memory bandwidth utilized strictly for protocol processing. For an iSCSI initiator or target, receiving data on a 10GE network interface means using much of the host's system bus bandwidth only and exclusively to copy data from the network buffers to storage buffers associated with the original SCSI commands.

In addition to host memory subsystem, in the case of iSCSI host CPU comes under severe pressure because of CPU-intensive cyclic redundancy check (CRC32c) calculations— the calculations that have to "touch" every single byte of the iSCSI headers and payloads multiple times.

The high host processing overhead associated with the movement of user data to and from the network interface under high speed conditions was thoroughly studied over the recent years, and before. For instance, RFC 4297, "Remote Direct Memory Access (RDMA) over IP Problem Statement", examines the overhead associated with the movement of user data in the end-system network I/O processing path at high speeds and makes a case for RDMA over TCP (a. k. a. iWARP). The RFC 4297 problem statement that "overhead due to the movement of user data in the end-system network I/O processing path at high speeds is significant, and has limited the use of Internet protocols in interconnection networks" applies to iSCSI, in its fullest.

As per IDC report, iSCSI SAN will remain the fastest growing interconnect segment of the market representing a quarter of the external disk storage systems market revenue in 2011. The exploding demand, along with wider and accelerating proliferation of 10GE technology, only exacerbates the well-known problem—the high processing cost that manifests itself as host CPU(s) and host memory subsystem utilized strictly for purposes related to iSCSI protocol processing.

This conventional solution for the stated problems is: protocol offload. Offloading the most expensive parts of iSCSI processing relieves the pressure on host memory subsystem and reduces CPU utilization. The corresponding devices that provide advanced iSCSI capabilities are often called iSCSI Host Bust Adapters, or HBAs.

FIG. 1 illustrates a conventional system 100 including host 102 and iSCSI HBA 104, in accordance with the prior art. To provide iSCSI offloads, iSCSI connection is typically fully terminated in the HBA 104. In addition, the existing iSCSI HBAs 104 include TOE 106—simply because it is it is generally considered that since iSCSI uses TCP to transport iSCSI Protocol Data Units (PDUs) 108 over IP network, offloading iSCSI from host 102 to HBA 104 requires offloading TCP 106 as well. Full iSCSI termination in the hardware increases complexity and cost of the iSCSI HBA 104 products. Even more importantly, offloading TCP 106 comes with a heavy baggage—a set of TCP Offload Engine (TOE) 106 specific challenges and hurdles, some of which are technical and others non-technical. Technical complexity of implementing TCP 106 in the network adapter 110, widely-accepted realization that in isolation, all by itself, TOE 106 rarely provides meaningful performance benefits, lack of TOE support in all major operating systems, general inability to provide security and functionality upgrades for the offloaded TCP 106—all these factors in combination have caused many failure scenarios in the protocol offloading industry and have so far prevented successful wide-spread deployment of the corresponding iSCSI HBA 104 solutions. All these factors in combination create the need to offload iSCSI 112 without terminating its connections in the adapter 110 and without offloading TCP 106.

Therefore, there is a need to offload iSCSI 112 and thus minimize or even altogether eliminate the high processing overhead associated with iSCSI processing 116, while at the same time not offloading TCP 106 and continuing using networking stack 108 of the host operating system. The present invention addresses such a need.

SUMMARY OF THE INVENTION

A ULP offload engine system, method and associated data structure are provided for performing protocol offloads without requiring a TCP offload engine (TOE). In an embodiment, the ULP offload engine can be implemented by the advanced capabilities iSCSI adapter providing iSCSI offload services. The present invention greatly reduces overall complexity of iSCSI HBA projects, and at the same time provides solution for the host memory and CPU bottlenecks when performing iSCSI protocol processing.

BRIEF DESCRIPTION OF THE DRAWINGS

FIG. 3 illustrates an exemplary sequence of two iSCSI commands being offloaded, transmitted, received by the remote site, and responded to.

DETAILED DESCRIPTION OF THE INVENTION

Figure 1:
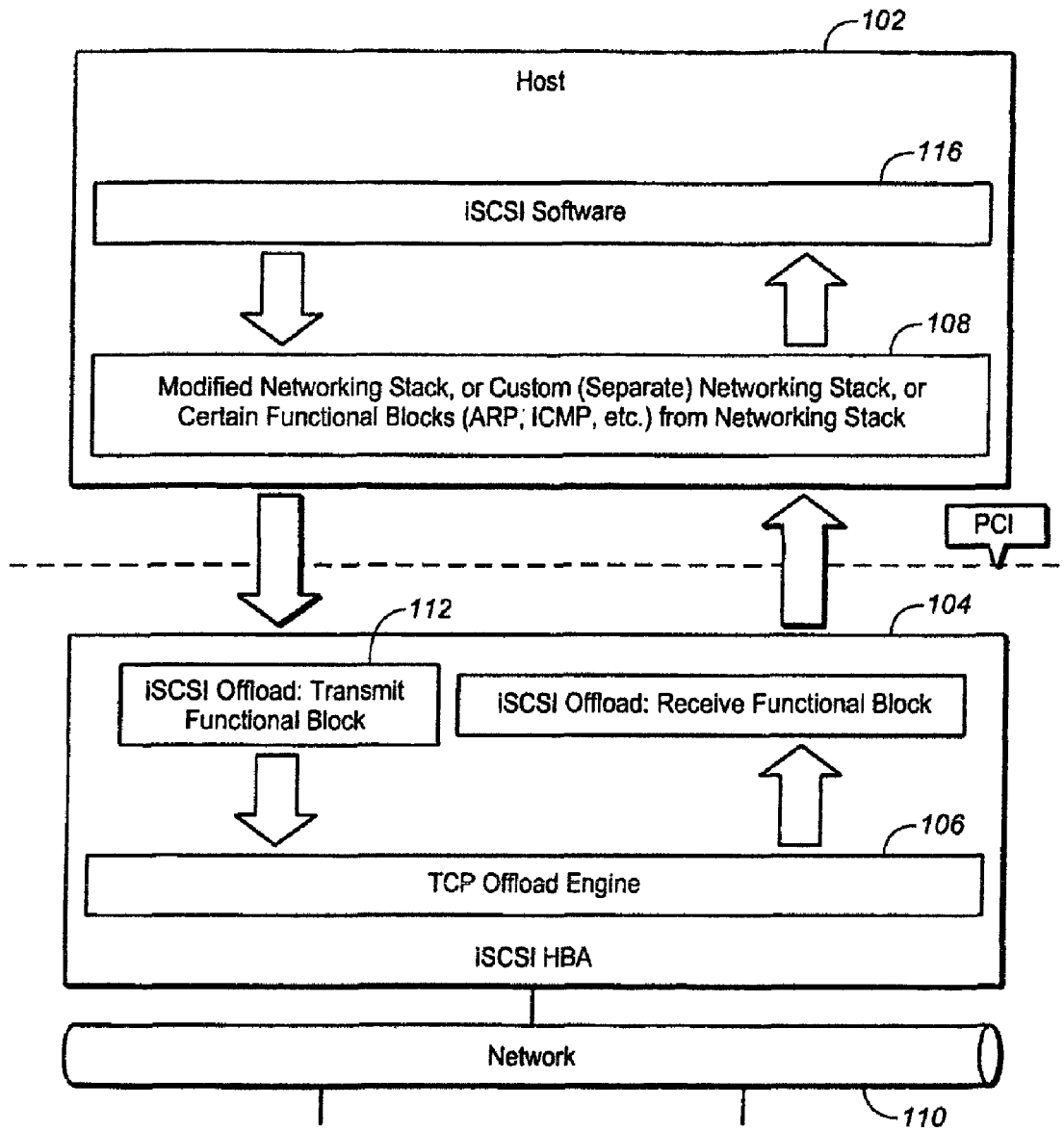
FIG. 1 illustrates exemplary system including both a host, a TCP Offload Engine, and iSCSI offload capabilities in accordance with the prior art.

The present invention relates generally to remote block storage and specifically to accessing remote block storage over the Internet. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

| TERMS | |
|---|---|
| Abbreviation | Definition |
| iSCSI | Internet Small Computer System Interface |
| RDMA | Remote Direct Memory Access Protocol |
| TOE | TCP Offload Engine |
| CRC32c | Cyclic Redundancy Check |
| HBA | Host Bus Adapter |
| ULP | Upper Layer Protocol |
| PDU | Protocol Data Unit |
| LRO | Large Receive Offload |

The invention presents several additional benefits. To provide iSCSI offloads, connection is fully terminated in the existing iSCSI HBAs. However, iSCSI termination in the hardware or firmware increases complexity and the cost of HBAs. To state it differently, offloading iSCSI endpoint means complexity and higher cost, while at the same time not having the benefits of bigger memory and faster CPUs that host platforms can (and will always) provide. The present invention does not terminate iSCSI connection. Unlike the conventional iSCSI HBAs, embodiments of the present invention do not own iSCSI connection and, importantly, do not play any role in a complex connection establishment and iSCSI parameter negotiation process.

Another important characteristic of the present invention is that it does not require any special, and invariably complex, logic to place out of order data. The present invention effectively performs speculative pre-TCP Layer 5 (L5) processing on the receive side, while capitalizing on the fact of infrequent re-orderings in Data Center environments, many of which can be in fact optimized-out "in place" with little extra buffering and minor extra complexity.

Yet another useful aspect of the present design is that the slow path, including the one that is triggered by reorders and retransmissions, will run at a full Layer 2 (LRO optimized) speed. That is not so for conventional iSCSI HBAs. In conventional offloaded solutions and products reorders and retransmissions trigger complex resource-bounded (slow path) processing in the offload engines. In addition to extra complexity and cost, the corresponding performance benchmarks show results much worse than the ones shown with simple and inexpensive "dumb" NICs. The present invention operates below Layer 5 (but above Layer 4)—on iSCSI PDU level, but below the level of iSCSI commands—which allows it to naturally "toggle" between offloaded and non-offloaded, "pure" Layer 2 operation.

From a protocol layering perspective, iSCSI is layered on top of the TCP. In that sense, iSCSI can be called Upper Layer Protocols, or ULPs. In the context of this invention, the terms iSCSI and ULP are used interchangeably; however, methods and mechanisms described herein are applicable to other ULPs, including RDMA (iWARP) and MPI.

A ULP offload engine 206 and 208 system, method and associated data structure are provided for performing protocol offloads. In one embodiment, the ULP offload engine 206 and 208 provides RDMA offload services. In another embodiment, the ULP offload engine 206 and 208 provides iSCSI offload services. In still another embodiment, the ULP offload engine 206 and 208 provides both iSCSI and iWARP offload services.

Figure 2:
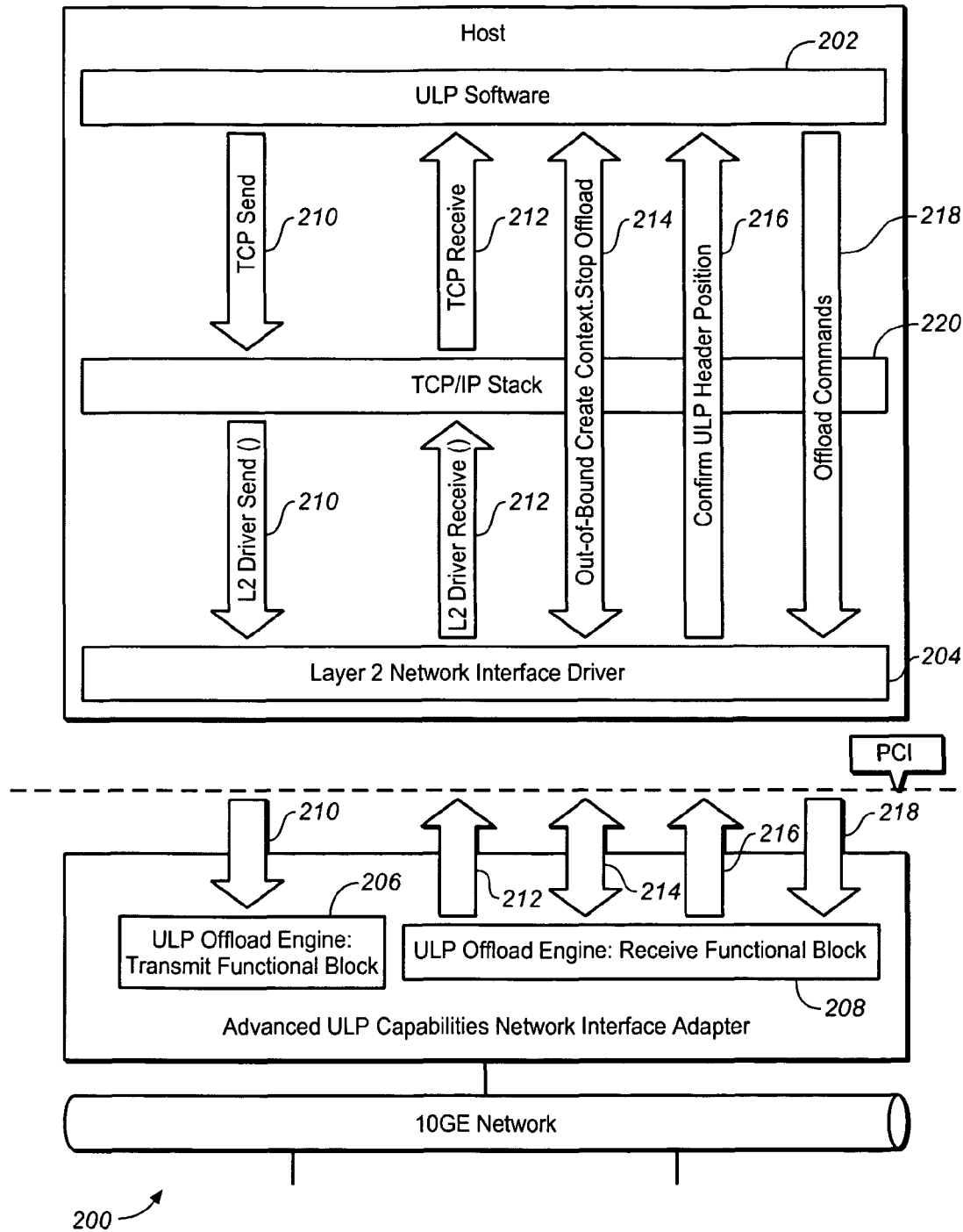
FIG. 2 illustrates an exemplary architecture in which one embodiment may be implemented.

FIG. 2 illustrates an exemplary architecture 200 in which one embodiment may be implemented. The picture shows functional blocks and basic communication mechanisms between them. The functional blocks are: ULP software 202, network device driver 204, and ULP offload engine is represented as two functional blocks: transmit block 206 and receive block 208. Regular transmit 210 and receive 212 channels are used normally by the TCP/IP stack and TCP applications. Out-of-band management channel 214 is utilized, to create, disable, enable, or destroy control structures in the ULP offload engine. APIs are serialized with the transmit data path 218 (posting or offloading commands) and receive data path 216 (specifically for iSCSI—confirming header position). The majority of communications takes place over regular transmit 210 and receive 212 channels—the regular send and receive mechanisms employed by all conventional TCP applications, with TCP stack 220 serving as an immutable black box to perform its part of the processing.

Figure 3:
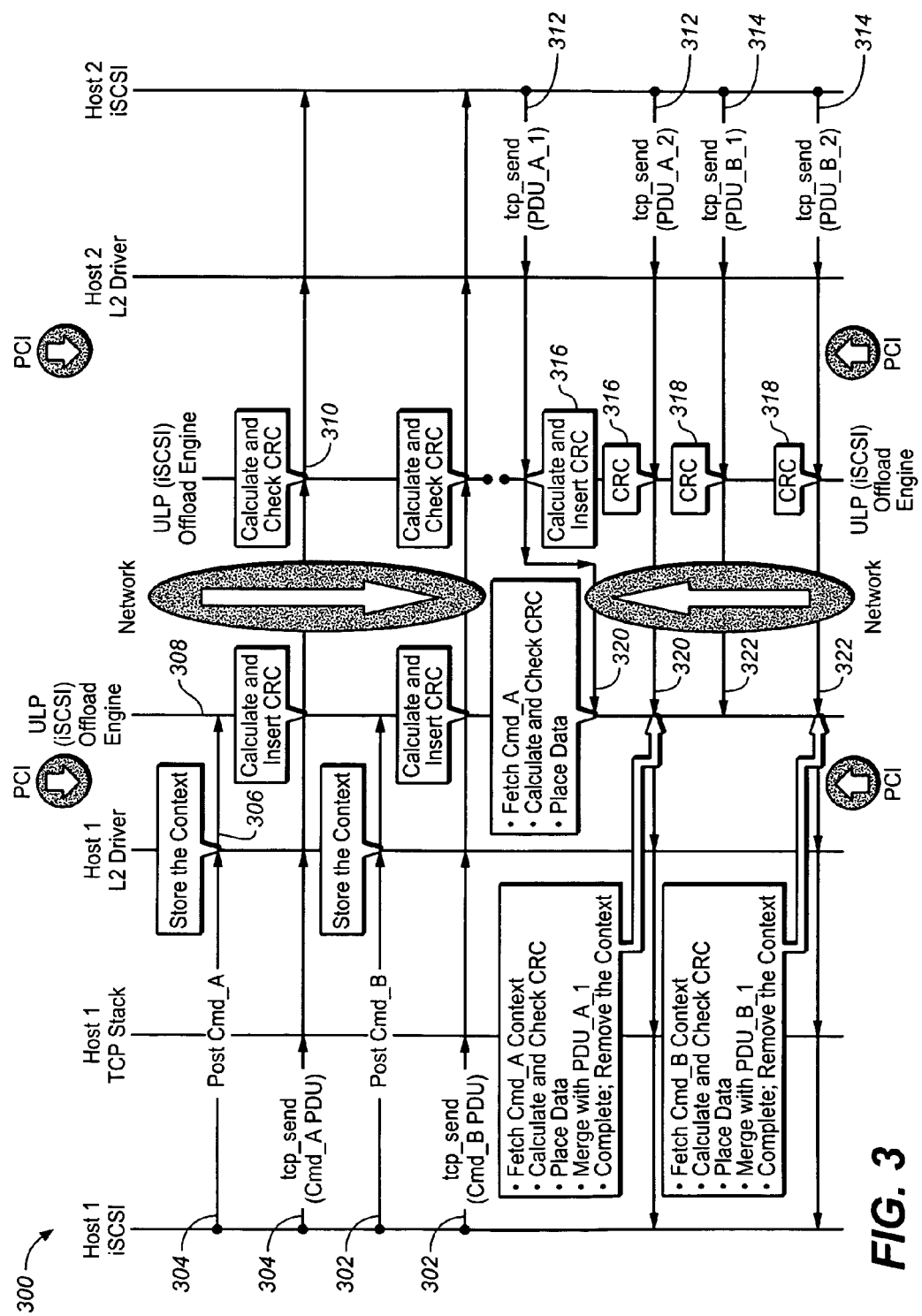

FIG. 3 illustrates an exemplary sequence 300 of two iSCSI commands being offloaded, transmitted, received by the remote side, and responded to. In this present context, it makes sense to define iSCSI command. As far as the receive functional block 208 of the ULP offload engine is concerned, the corresponding control structure has a lifecycle of a single Read (for iSCSI Initiator) or R2T (for iSCSI Target), and carries the corresponding list of data buffers. There are no offloaded commands on the transmit side. There are no offloaded commands if the receive side of the ULP offload engine is configured not to perform direct data placement. The offloaded commands are only required to facilitate direct data placement on the receive side. Moreover, by not posting (offloading) iSCSI commands, the host based iSCSI software effectively stops direct data placement, which provides an additional flexibility to control ULP offload engine at runtime.

Both receive and transmit sides employ the ULP offload engine described herein. On the picture, Host 1 posts 302 (that is offloads) command A 304, at which point the ULP offload engine stores the corresponding context 306 for future usage (for the purposes of direct data placement). Next, Host 1 uses regular TCP send to transmit iSCSI PDU 308 (that contains the command A denoted on the picture as Cmd_A). Later this command is received by Host 2, which calculates and checks CRC (which may include validating of either header digest or data digest or both) of the corresponding iSCSI PDU 310. Next, the Host 2 responds with two iSCSI data PDUs 312. These iSCSI PDUs 312 and 314 contain a certain iSCSI-specific tag that identifies a command control structure (offloaded command). For iSCSI Initiator that iSCSI-specific tag would be Initiator Task Tag 312 or ITT, for iSCSI Target that tag is Target Transfer Tag 314 or TTT. Host 2 calculates and inserts iSCSI CRC into those PDUs 316 and 318 prior to putting them on the wire. Finally, Host 1 receives those PDUs 320 and 322, loads the corresponding offloaded command context based on the iSCSI tag, and performs direct data placement into SCSI buffers associated with the original command A, thus optimizing out an overhead of extra copy on receive.

FIG. 3 implies a scenario that must be handled by embodiments of the present invention: posting (offloading) of the commands for the purposes of direct data placement may create a race with the receive side processing. One embodiment ensures that commands (Read, for iSCSI Initiator, and R2T for iSCSI Target) are posted prior to the step (3) of the following sequence: (1) the command reaches remote iSCSI, (2) the command is processed by the remote iSCSI, and the latter transmits response data, and (3) the data reaches the local receive functional block 208 of the ULP offload engine.

Still, another embodiment does not serialize offloading of the commands via 218 with the receive processing. In this embodiment, the host based iSCSI software explicitly removes offloaded command via 214 from the ULP offload engine if all the data for this offloaded command was received via regular TCP. This is to prevent an extremely rare case when all the data for this offloaded command was received even before the ULP offload engine got hold of this command, which in turn would mean that this command could be interpreted by the ULP offload engine as the one for the future not-yet-received PDUs, and will therefore stay in the engine's memory after it in fact is completed. This shall never be permitted.

The ULP offload engine described herein does not terminate ULP connection. The illustrated ULP offload engine does offload CRC32c calculation (also referred to as iSCSI CRC or simply CRC) on both transmit and receive sides, if configured. This effectively offloads host CPU from performing CPU intensive operations associated with the ULP processing. In addition, the receive functional block 208 of the ULP offload engine performs direct data placement of received data into application buffers. For instance, in the case of iSCSI, the ULP offload engine offloads iSCSI Read processing for iSCSI Initiator, and iSCSI R2T processing—for iSCSI Target.

The present invention, instead of acting on a Layer 5 (L5) command level, which is typical for existing iSCSI HBAs, acts on an iSCSI PDU level—PDU by PDU. As a result, error processing, which must be part of any implementation and any offloaded design, is greatly simplified.

ULP offload engine described herein implements a connection level state machine 400 (FIG. 4), with the two fundamental states: ULP (iSCSI) and TCP stream 406 (also denoted on FIG. 7 as 702 and 704 respectively). In addition, ULP offload engine implements a PDU level state machine running hardware-friendly (PDU delineation, PDU-by-PDU processing) logic on the receive side (FIG. 4), and on the transmit side. On its receive side, this second state machine uses TCP stack 220 (518 on FIG. 4A) to deliver results of its processing (that is, offloads) to the host based iSCSI software. This second, PDU level state machine is insulated from the complex inter-PDU exceptions.

Figure 4:
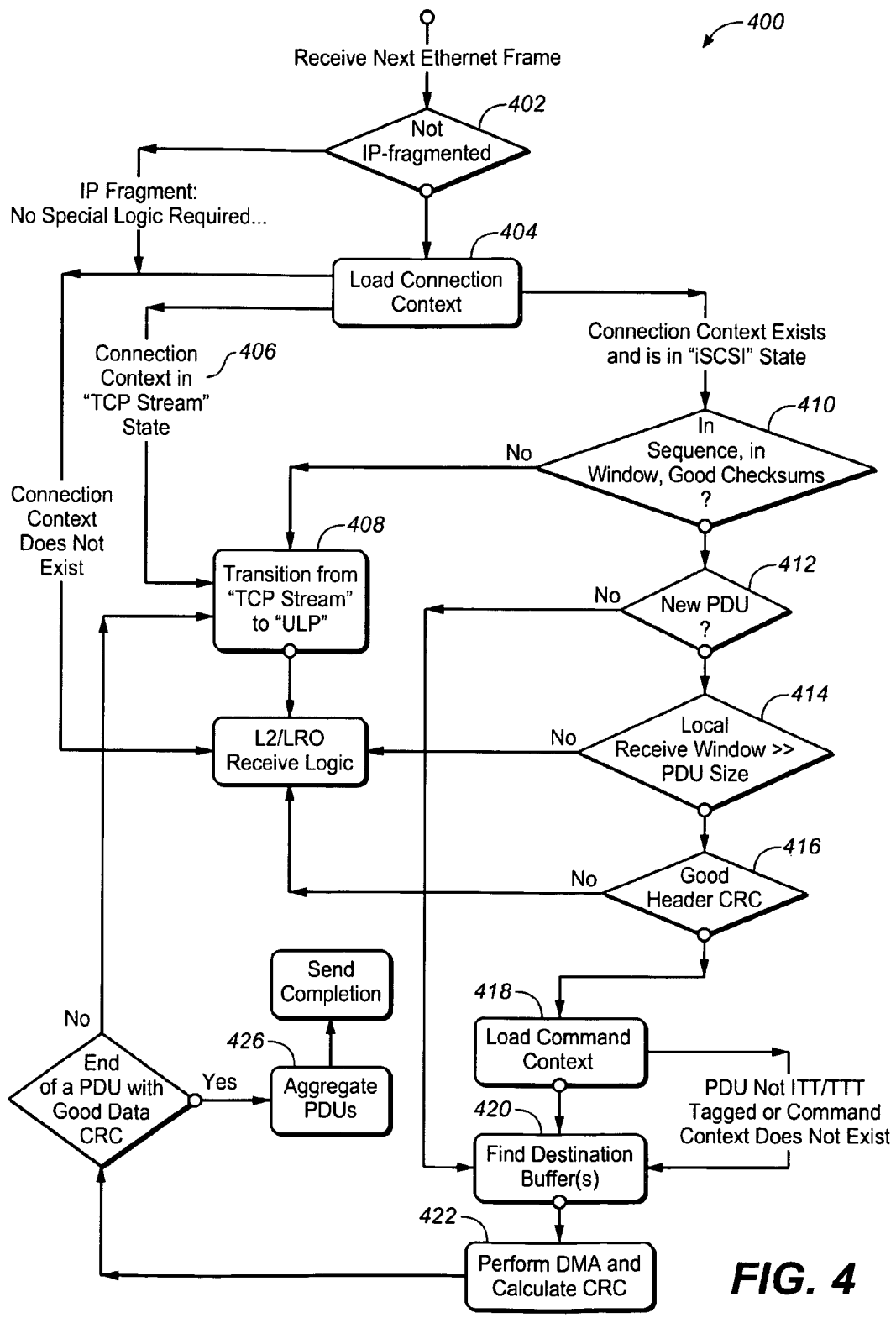
FIG. 4 illustrates ULP offload engine's receive processing logic, in accordance with one embodiment.
Figure 4A:
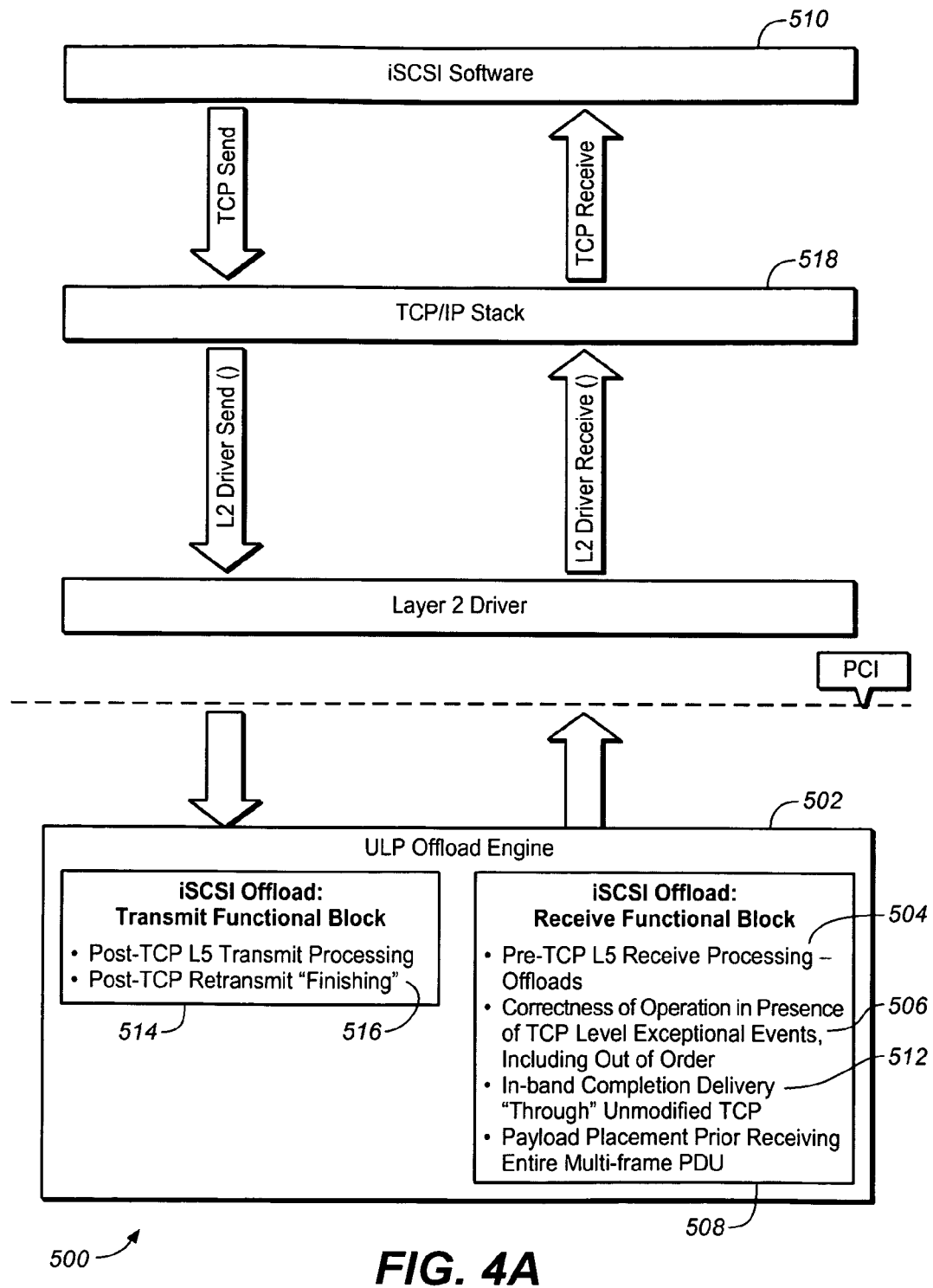
FIG. 4A illustrates specific responsibilities of the ULP offload engine, in accordance with one embodiment.

FIG. 4A enumerates specific responsibilities—the set of issues addressed and resolved by the TOE-less iSCSI HBA 500 in accordance with the present invention. On the receive side, the receive functional block 508 of the ULP offload engine 502 classifies received iSCSI PDUs as such (that is, as iSCSI PDUs), and performs pre-TCP delineation of the iSCSI PDUs in the incoming TCP byte stream. Such operation may also be termed speculative in the sense that Layer 5 delineation and part of the receive processing (ie, receive side offloads 504) is happening prior to TCP processing in the host. However, "pre-TCP" does not mean that the receiving functional block 508 of the ULP offload engine 502 does not perform some of the TCP processing—because it does. Each arrived TCP segment is checked for a number of conditions, and verified against the state information in the receive connection context associated with the corresponding iSCSI connection. In that latter sense, iSCSI delineation and pre-TCP processing 504 on the receive side is in fact not speculative. The invention presents mechanisms (described herein) to ensure correctness of operation 506 in presence of protocol errors, sequence errors, and other exceptional events.

In terms of iSCSI protocol semantics, what is effectively offloaded on the receive side is: Initiator's Read (for iSCSI Initiator) and Target's R2T (for iSCSI Target), while the ULP offload engine 502 performs direct data placement for Data-In PDUs (iSCSI Initiator) and Data-Out PDUs (iSCSI Target). Ability to calculate and check (on the receive side) or insert (on the transmit side) iSCSI CRC, combined with the ability to place iSCSI data directly means that effectively the entire iSCSI fast path can be offloaded, without any awareness in the offload engine 502 of the exact L5 level semantics of those offloads.

Additionally, on its receive side the ULP offload engine 502 ensures correctness of operation in presence of protocol errors and other exceptional events (FIG. 4 and FIG. 7), including out of order received TCP segments (410, 712), which otherwise would conventionally be handled by the TOE.

A vital information related to ULP offload engine 502 executed offloads can be delivered to the receiving iSCSI software in the host both out-of-band via separate completion queue, or in-band "through" (and by) the native TCP stack 518. An embodiment of the present invention delivers control information in-band 512. This is achieved by modifying certain bits of the received iSCSI headers—the mechanism termed herein as Benign Header Modification, the modification that is transparent from the local TCP perspective.

Being a PDU-level protocol engine, the receive functional block 508 of the ULP offload engine 502 does not concern itself with inter-PDU exceptions. That is, a scenario when any given iSCSI PDU was wholly processed and delivered (possibly, directly placed) in the iSCSI state, and the immediate next PDU was for whatever reason delivered via non-offloaded Layer 2 receive channel (also denoted on FIG. 4 as "L2/LRO receive logic" functional block)—this common scenario is totally transparent for the implementation. This transparency alone removes considerable complexity plaguing all conventional implementations.

On the transmit side 514, ULP offload engine 502 performs post-TCP L5 transmit "finishing" of iSCSI PDUs, that are post-TCP delineated, CRC-calculated, with CRC being inserted into outgoing PDUs.

In addition, TCP retransmit is spotted and the corresponding stored CRC values are re-inserted at their respective locations. A system and method in accordance with the invention provides the following additional benefits. TOE is not used, and the host TCP/IP stack remains intact. Software ULP code can be reused with minor modifications; the modifications that make use of the ULP offload engine 502 may in fact be introduced incrementally. Host based ULP software controls each of the offloads separately at runtime. All offloads are independently configured, and can be used in any combination. ULP connection is fully established and negotiated in the host, using unmodified host based TCP stack 518. Host based ULP software implements any meaningful policy, possibly at runtime, and on a per connection basis, to offload or not to offload ULP commands. One criterion could be based on the size of the command, with minimum-size-to-offload configurable either on a per connection basis or globally.

FIG. 4 illustrates ULP offload engine's 502 receive processing logic, in accordance with one embodiment 400. Referring to FIGS. 4A and 4 together, after Ethernet frame arrives, a number of checks is performed, to determine whether the frame contains a valid and in-order TCP segment 402. For a non-IP fragmented valid TCP segment, via step 404, a corresponding per-connection control structure (receive connection context) is identified, based on the Ethernet, IP, and TCP layers' control information. The receive connection context is identified by information from the incoming frame's protocol headers including TCP 4-tuple connection identifier consisting of source IP address, source port, destination IP address, and destination port.

The identified receive connection context may correspond to a TCP connection used by ULP to reliably transport its data over IP network. If this is the case, the connection context describes a state of the receive side of the ULP connection. Further, a combination of the receive connection context and the arrived TCP segment's header and data is used to perform protocol offloads on the receive side.

A valid received TCP segment may undergo additional check, in being within the current TCP receive window, via step 410. In one embodiment, on its transmit side the ULP offload engine 502, keeps updating the matching "transmit connection context" (the control structure described herein) with the last sent acknowledgment number and the last sent window, while on its receive side, the ULP offload engine 502 runs an additional in-window test (among other TCP-level checks 410) for each TCP received segment.

A valid and in-order received TCP segment may contain ULP header (denoted as new PDU on FIG. 4, via step 412). The ULP offload engine 502 uses receive connection context to identify a position of ULP header in the TCP segment. In one embodiment, each newly arrived iSCSI PDU triggers an additional check of the current size of the corresponding TCP receive window (step 414). This check is present specifically for the corner cases when the TCP receive window of the corresponding connection is getting comparable or even smaller than the size of incoming iSCSI PDUs. As per iSCSI RFC, MaxRecvDataSegmentLength is "the maximum data segment length in bytes it can receive in an iSCSI PDU". Therefore, the failure to pass "receive window>>MaxRecvDataSegmentLength" check 414 constitutes a special kind of an exception. Unlike other exceptional events (such as out of order received TCP segment or bad iSCSI data digest), a small TCP receive window does not trigger change of the connection state from ULP to TCP stream. A small TCP window requires delivery of TCP segments to the TCP receiver as soon as possible, so that the latter could generate TCP ACKs and the traffic could (slowly) proceed. Therefore, for each new PDU (412), the ULP offload delivers it to the host via L2/LRO receive logic (shown on FIG. 4) if the TCP receive window of the corresponding connection is getting comparable or smaller than the MaxRecvDataSegmentLength of the corresponding iSCSI connection. This mechanism can be viewed as ad-hoc Layer 5 offloads disablement that does not entail ULP to TCP stream state change.

Further, once the new ULP header is identified, the header's CRC (referred to as iSCSI header digest) is calculated, if negotiated for the connection, via step 416. Further, a valid ULP header is used to exactly identify the position of the next (not yet arrived) ULP header in the TCP stream. Thus, being a simple PDU-level processing machine, the ULP offload engine 502 effectively delineates TCP byte stream into L5 level messages, while not terminating and not taking ownership of the ULP connection.

A valid ULP packet may contain a certain ULP-specific tag that identifies a command control structure (offloaded command). If present, the offloaded command describes how the data contained in the packet is to be stored (placed) in host memory. An offloaded command may contain data buffers directly accessible by the application that uses ULP transport. Placing the data directly into those buffers means avoiding extra copy on receive, via step 420. If offloaded command is not present, ULP packet is placed in the regular network stack (or network interface driver) buffers in the host.

A valid and in-order TCP segment may contain a part of ULP header. In one embodiment, part of the header is stored (buffered) by the ULP offload engine 502 until arrival of the next TCP segment. If the next TCP segment is valid and in-order, the full ULP header is restored and used for further processing.

Depending on whether the received ULP header contains ULP specific tag that identifies offloaded command, and whether the offloaded command is posted by the ULP software and stored in the ULP offload engine 502, the latter is capable to find destination buffers (see FIG. 4), also via step 420. In one embodiment after identifying destination buffers, the ULP offload engine 502 performs DMA to place ULP data into those buffers in the host memory, while simultaneously calculating data CRC. Note data CRC may cover tens of kilobytes of data (which is particularly true for iSCSI, with negotiable data PDU length), which only increases the motivation to calculate CRC in the DMA engine after the PDU boundaries are identified, while the data is streaming out of the device (that comprises the ULP offload engine) and into the host memory. FIG. 4 illustrates this process as a functional block titled Perform DMA and calculate CRC, via step 422.

Being a PDU-level processing machine, the receive functional block 208 of the ULP offload engine cooperates with the network interface driver 204 to deliver iSCSI PDUs atomically, as far as offloads are concerned. The corresponding principle can be reformulated as follows: Layer 5 offloads either apply to entire iSCSI PDU, or they don't. One straightforward conclusion from this general principle is that pre-TCP Layer 5 processing by the ULP offload engine never starts in the middle of a PDU. That is, if the ULP offload engine has processed a given ULP header while in TCP stream state, the corresponding ULP packet data is also processed in this same state, and delivered via non-offloaded "L2/LRO receive logic" functional block (FIG. 4).

A given offloaded command may be used multiple times, to directly place data from multiple ULP packets received on the corresponding connection. The ULP offload engine 502 maintains the offloaded command's control structure, which contains information of the data already placed in its data buffers. The present invention provides mechanisms for ULP offload engine 502 to retire (ie, remove, cleanup) offloaded commands from its memory. In one embodiment, after the offloaded command's data buffers are filled with the received iSCSI data, the ULP offload engine 502 removes this command from its memory. In one embodiment, the data already placed into offloaded command's referenced buffers is not permitted to overlap with a newly arrived ULP data; such an overlap triggers transition from the ULP to TCP stream state, with the subsequent recovery back to ULP state via 408 logic, also shown in detail on FIG. 6.

In general, independently of implementation, any offload mechanism that places data directly must be able to deterministically decide when to remove (cleanup) the corresponding control structure with its associated receive buffers. For the ULP (iSCSI) offload engine 502, the corresponding control structure has a lifecycle of a single Read (for Initiator) or R2T (for Target), and carries the corresponding list of data buffers. In one embodiment, ULP offload engine 502 relies on iSCSI negotiable parameter DataPDUInOrder. The following excerpt from iSCSI RFC 3720 illustrates the logic: "The Buffer Offset field contains the offset of this PDU payload data within the complete data transfer. The sum of the buffer offset and length should not exceed the expected transfer length for the command. The order of data PDUs within a sequence is determined by one of the iSCSI negotiable parameters called DataPDUInOrder. When set to Yes, it means that PDUs have to be in increasing Buffer Offset order and overlays are forbidden."

Combined with the fact that the default DataPDUInOrder value is Yes, and if in fact it is set to Yes on a given iSCSI connection, this presents an easy way to determine an exact timing when an offloaded command can be removed (ie, cleaned up), and that is when all the corresponding data buffers are filled out at continuously incrementing offsets and without overlaps, as required by the standard.

A system and method in accordance with the present invention, however, does not require iSCSI data to arrive in order. The ULP offload engine supports iSCSI PDU arrival in any order, by performing a certain limited checkerboarding of destination buffers. The corresponding limits may be configured, for instance, to allow up to N "islands" of data per each offloaded command, which in the worst case requires 2N (offset, length) pairs of numbers per command. Once the configured limit on the number of non-contiguous "islands" is exceeded, the ULP offload engine simply flushes (ie, removes, cleans up) the corresponding offloaded command from its memory and thus effectively stops direct data placement for this command. The remaining not-yet-received PDUs destined for this command will "travel" through host TCP/IP stack, with the host based iSCSI software having full information, via mechanisms described herein, of which iSCSI PDUs are already directly placed and which are not.

The ULP offload engine 502 maintains receive connection context, the state of which may be: TCP stream or ULP. For the ULP=iSCSI, the two states would be, respectively, TCP stream and iSCSI. For connection in ULP (iSCSI) state, ULP packets are delineated in a received TCP byte stream, CRC calculated and validated.

Figure 5:
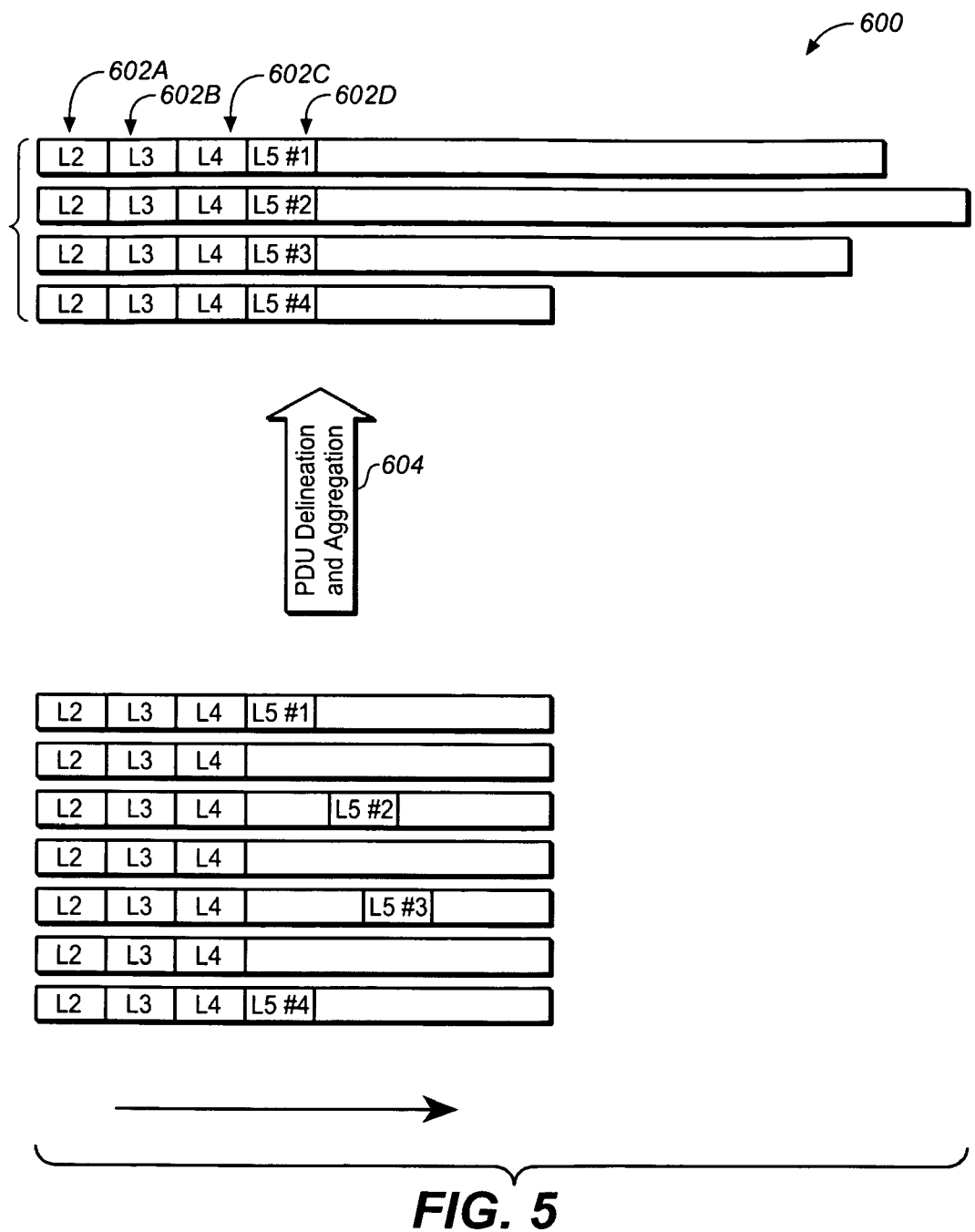
FIG. 5 illustrates ULP packet delineation and aggregation.

The present invention provides mechanisms (described herein) to place ULP data directly into buffers associated with offloaded commands. FIG. 5 illustrates the ULP offload engine 502—performed transformation of the TCP byte stream into ULP packets 600. The picture shows an example of 4 ULP packets built from 7 TCP segments and presented by the ULP offload engine 502 to the network interface driver, after the former (ie, the engine) has performed PDU-based aggregation and stripped off intermediate L2/L3/L4 (ie, Ethernet, IP, and TCP accordingly) headers. The picture is simplified—in a general case due to limited buffering capacity we may see L2/L3/L4 headers within any given PDU, especially for PDUs larger than a certain size.

As stated above, the ULP offload engine 502 cooperates with the network interface driver 204 to deliver received ULP PDUs atomically, as far as Layer 5 offloads are concerned. Each time the ULP offload engine 502 receives ULP PDU, it applies the required offloads (including possibly direct placement), calculates data CRC (if required), and signals the network interface driver that this entire PDU is done—that is, completed. For the network interface driver 204 that completion notification would mean that the corresponding set of buffers including protocol headers and, possibly, ULP data (depending on whether direct placement was performed for this PDU or not) can be delivered to the host networking stack. In one embodiment, the ULP offload engine 502 uses a new buffer for the start of the next PDU. Referring back to FIG. 6, the headers of the 4 shown aggregated ULP packets would each be placed into separate networking driver/stack buffers.

Independently of whether a given PDU can be directly placed, and whether direct data placement is enabled by the host ULP software, the ULP offload engine 502 always supplies both the host networking stack and the host ULP software with the protocol control information, in a form of protocol headers. That is, the ULP offload engine 502 places protocol headers—but not necessarily ULP data—into host-based network buffers—the buffers owned by the host based native networking stack and/or network interface driver. For iSCSI, this protocol control information includes Ethernet, IP, TCP, and iSCSI headers.

This "placing of Ethernet, IP, TCP, and iSCSI headers" into regular networking driver/stack buffers also means that the present invention can be deployed with the existing networking stacks, while the existing ULP software will require only little modifications, and only to make use of the ULP offloads. Secondly, this can done with the performance-optimizing affect of ULP PDU aggregation described herein.

In one embodiment, when operating in ULP (iSCSI) state, ULP offload engine 502 aggregates ULP packets. Instead of notifying the network interface driver each time a new ULP packet is received, the engine will aggregate two or more packets. The engine can aggregate any number of back-to-back ULP PDUs that are not directly placed. Secondly, the ULP offload engine 502 is permitted to aggregate any number of consecutive packets targeting the same offloaded command. In both cases, the aggregation is performed to optimize PCI utilization, number of adapter-generated receive interrupts, and as well as receive indications (upcalls) performed by the network interface driver 204—that is, for the same reasons that already proved to work for a Large Receive Offload (LRO) that is currently widely deployed in all major operating systems. However, as opposed to LRO, the ULP offload engine 502 performs the aggregation strictly preserving the ULP packet boundaries. The corresponding functional block is denoted on FIG. 5 as Aggregate PDUs, via step 426.

Transition of the receive side of ULP connection from ULP to TCP stream state 604 disables all receive side offloads. The transition is triggered by a number of events, including out-of-order TCP segment, iSCSI data digest error, and others related to possible validity checks on the arrived Ethernet frame and IP, TCP, and ULP headers. In one embodiment, an out-of-order TCP segment is temporarily buffered, to possibly restore an order of the TCP byte stream without immediately transitioning from ULP to TCP stream state. A system and method in accordance with the present invention provides this and other mechanisms to optimize certain out-of-order scenarios.

Figure 7:
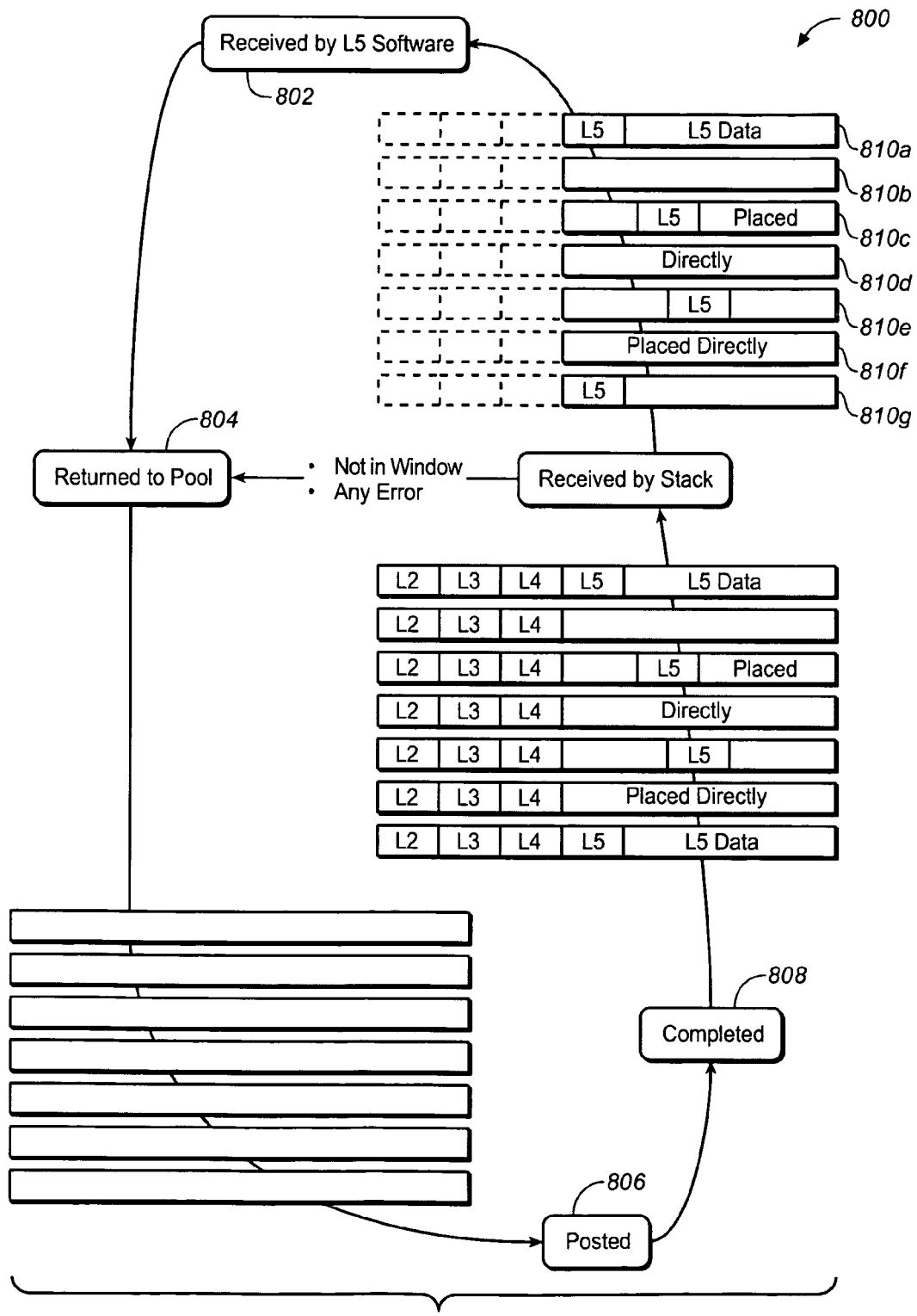
FIG. 7 illustrates receive buffer life cycle, in accordance with one embodiment.

Referring back to FIG. 4A and FIG. 4, some of the state transitions by ULP offload engine's 502 maintained receive side of ULP connection are illustrated. The first set of checks is performed on each newly received Ethernet frame—if the frame is IP fragmented, or the corresponding TCP segment is out of order, or IP or TCP checksum(s) are not good, the ULP offload engine 502 marks the connection as TCP stream and invokes a block of logic denoted as Transition from TCP stream to ULP, also via step 408. Secondly, if data CRC is used, at the end of each ULP packet the ULP offload engine 502 has an opportunity to compare the calculated data CRC with the one that is part of this ULP packet. FIG. 7 also shows these same exceptional events, including for instance bad data CRC that triggers transition to TCP stream state (FIG. 7, 712).

Figure 6:
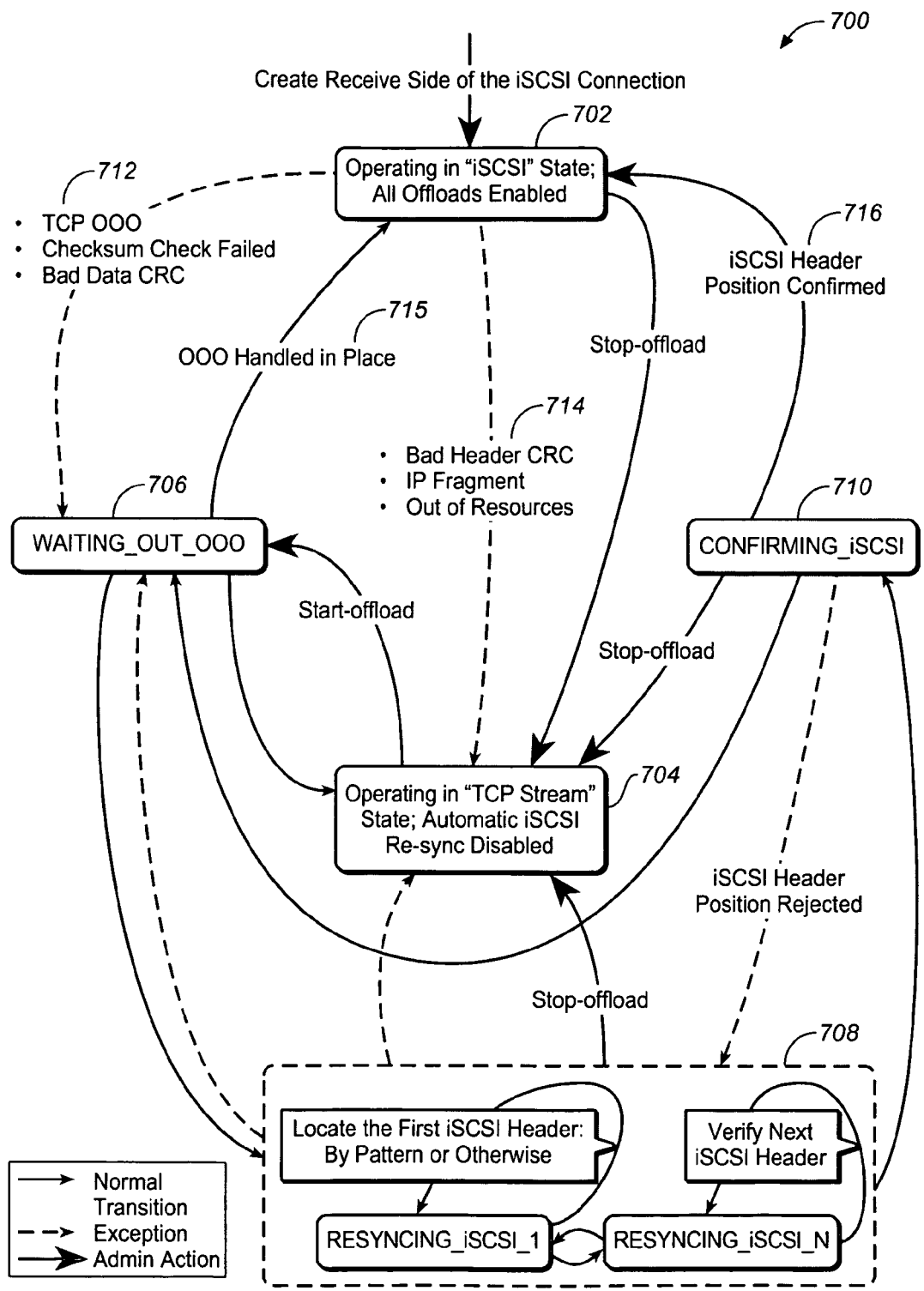
FIG. 6 illustrates state transitions by ULP offload engine's maintained receive side of iSCSI connection, in accordance with one embodiment.

FIG. 6 illustrates state transitions by ULP offload engine's 502 maintained receive side of iSCSI connection 700 in greater detail. Most of the time the connection operates in iSCSI 702 (or ULP) state. FIG. 6 shows some of the events that trigger transition to TCP stream state 704. Transition of the receive side of ULP connection from ULP to TCP stream can be done administratively, when requested by host based ULP software. Symmetrically, the host based ULP software can request that ULP offload engine 502 transitions the receive connection back from TCP stream 704 to ULP (iSCSI) 702 state, based on any criteria or management policy host ULP software may implement.

A system and method in accordance with the present invention may provide mechanisms (described herein) whereby the ULP offload engine 502 performs TCP stream to ULP 702 transition autonomously, without communicating to the host. A system and method in accordance with the present invention may provide additional mechanisms, whereby the ULP offload engine 502 performs TCP stream to ULP 702 transition semi-autonomously, using certain host based ULP software provided services. FIG. 6 illustrates this semi-autonomous transitioning as an extra sub-state of the TCP stream state, denoted as CONFIRMING_ISCSI 710.

In one embodiment transition from the TCP stream 704 back to iSCSI state 702 uses the following sub-states: WAITING_OUT_OOO 706, RESYNCING_ISCSI 708, and CONFIRMING_ISCSI (FIG. 6) 710. The WAITING_OUT_OOO 706 is used to make sure that TCP stream is back in order. This sub-state is a simple way to ensure that a well behaved connection with only occasional out-of-order (OOO) exceptions is back in order by the time we invoke the logic of the subsequent sub-states. The RESYNCING_ISCSI sub-state 708 is used to receive and validate a configurable number of iSCSI PDUs (while still remaining in TCP stream state, with offloads temporarily disabled). Finally, the CONFIRMING_ISCSI sub-state 710 is optionally used to perform a handshake with the iSCSI software in the host to confirm iSCSI header position. FIG. 6 denotes some of the state transitions connecting these sub-states. In one embodiment, an out-of-order TCP segment is buffered, to possibly restore an order of the TCP byte stream without immediately transitioning from ULP to TCP stream state. The corresponding transition is denoted as an arrow 715 titled OOO handled in place on FIG. 6.

When in TCP stream state, the ULP offload engine 502 manages transition of the receive side of ULP connection (receive connection context) back to ULP state. In other words, certain exceptional events may cause TCP stream state to stick, with all the receive side offloads being disabled until (and if) the host based ULP software administratively clears this sticky state. A system and method in accordance with the present invention may provide mechanisms for the ULP engine to determine whether the receive connection context needs to remain in TCP stream state 704 until possible administration action by host based ULP software; in one embodiment such determination(s) are made based on TCP/IP level exceptional events such as IP fragmentation, bad iSCSI header digest, lack of ULP engine's own resources (714), and possibly other conditions triggering the transition of the receive connection context from ULP to TCP stream state.

FIG. 6 illustrates some of those exceptional events, namely: bad header CRC, IP fragmentation, lack of resources (in particular, lack of hardware resources if the ULP offload engine 502 is implemented in the hardware) to perform offloads. In one embodiment any one of these exceptional events causes the receive side of the ULP connection to operate in TCP stream state 704, with automatic ULP re-synchronization disabled until further "notice" from the host based ULP software. (FIG. 6).

Independently of why and when the receive connection context transitions from ULP to TCP stream and back, the ULP offload engine 502 owns and maintains the receive side of the ULP connection, while the host based ULP software maintains its own connection context for the lifetime of the ULP connection.

A system and method in accordance with the present invention may provide mechanisms to indicate for the host based ULP software whether the received ULP packet was properly delineated, whether the ULP offload engine 502 calculated and checked the packet's CRC(s), whether the packet CRC(s) are valid, and whether the packet's data was directly placed by the ULP offload engine 502 into host based application buffers. This vital information can be delivered to the receiving iSCSI software in the host both out-of-band via a separate completion queue, or alternatively, in-band "through" (and by) the native TCP stack 518. In one embodiment, prior to placing ULP header in the host memory, the ULP offload engine 502 performs Benign Header Modification to reflect this information.

Benign Header Modification requires that TCP checksum is offloaded. This basic assumption is violated if either: (a) the host TCP stack does not support TCP checksum offloading, and/or (b) the host TCP stack itself (always, sometimes) performs an extra check on the checksum. Today it is hardly even possible to find a networking stack that does not offload TCP and IP checksums. Still, for those stacks that do not or would not offload checksum, in either (a) or (b) cases, there exists an inexpensive corrective action—to fix the checksum. This "fixing the checksum" must be done by the receive functional block 208 immediately after the latter performs the Benign Header Modification on the bits of the iSCSI header. This "fixing" does not require to recalculate the entire TCP checksum. Computing and updating in the TCP header the TCP checksum for the purposes of offloading CRC32c is a fairly cheap operation. The same, however, is not true, as far as direct data placement is concerned. Without the TCP checksum fully offloaded, iSCSI command offload for the purposes of direct data placement is still possible, but expensive—and therefore not advisable.

In one embodiment, this Benign Header Modification consists in using high-order bits from the iSCSI header's DataSegmentLength field to unambiguously indicate to the host based iSCSI software whether the received iSCSI packet was properly delineated, whether its header and/or data digests were calculated and validated, and whether the packet's data was directly placed by the ULP offload engine 502 into host based SCSI buffers.

Specifically, in this embodiment the ULP offload engine 502 uses the two (2) most significant bits from the DataSegmentLength field, and assigns the following specific meaning to those bits:

- (1, 1)—PDU has passed all validity checks. All configured and enabled receive side offloads were performed on the packet. The packet was tagged, and the data was placed directly.
- (1, 0)—PDU has passed all validity checks. All configured and enabled receive side offloads were performed on the packet. The data was delivered using regular L2 receive buffers.
- (0, 0)—The receive side offloads are either administratively disabled, or the corresponding Ethernet frame has generated some kind of an L3/L4/L5 level exceptional event. It is up to the host software (TCP/IP stack or iSCSI software) to re-validate the packet and perform recovery actions.
- (0, 1)—Allocated specifically for exception handling (also described herein).

In one embodiment, receive side iSCSI offloads are enabled only when maximum length of the iSCSI PDU is negotiated to be less than a certain predefined maximum, which ensures that the high-order bits from DataSegmentLength field must be zeros in all iSCSI PDUs received on the corresponding iSCSI connection. For instance, negotiating MaxRecvDataSegmentLength (8192 bytes by default, as per iSCSI RFC) to be less than 4 MB ensures that the 2 most significant bits of the DataSegmentLength field of every received PDU's iSCSI header will be zeros; if this is not true, this would be a protocol error handled by the receiving functional block 208 of the ULP offload engine and triggering immediate ULP to TCP stream state transition of the corresponding connection, delivery of this particular badly formatted PDU via "L2/LRO receive logic" functional block (shown on FIG. 4), and subsequent recovery as described herein and illustrated on FIG. 6.

FIG. 7 illustrates receive buffer life cycle 806-808-810-800-802-804, in accordance with one embodiment. The picture shows an example of 4 ULP packets built from 7 TCP segments 810a-g and presented by the receive functional block 208 of the ULP offload engine to the network interface driver 204 (FIG. 2). As stated above, an embodiment may choose to use a new buffer for the start of each next PDU, so that aggregated or non-aggregated PDUs would each be placed into separate networking driver/stack buffers. FIG. 7 is simplified with respect to this fact (which is not shown). Two packets out of the illustrated four are directly placed, with the corresponding ULP headers modified in accordance with the Benign Header Modification mechanism described herein. TCP stack processes the L2/L3/L4 headers and hands over the received data to ULP software, after having stripped off L2/L3/L4 headers. The ULP software receives ULP packets 802, processes them with respect to offloads indicated in the corresponding ULP headers. For instance, if the ULP header indicates that the ULP data is already placed, the ULP software will not copy this data again, thus avoiding extra copy on receive. Eventually, the ULP software indicates to the TCP stack that the corresponding buffers are received by the application, at which point the buffers are returned back to the pool of receive buffers 804—for subsequent usage by the network interface driver.

In one embodiment, the original ULP header is stored in the receive connection context until the corresponding ULP packet is fully processed by the ULP offload engine 502 (after which the header is replaced in the context by the next one). In one embodiment this original ULP header is used to handle bad data CRC and transitioning to TCP stream state in the middle of receiving ULP packet scenarios. There are two sub-cases depending on whether the data from this PDU was placed directly, or not. If it wasn't, the ULP offload engine 502 simply re-DMAs the original header and lets the host ULP software to re-calculate data CRC, detect the error, and subsequently recover.

To handle a combination of bad data CRC along with direct data placement, in one embodiment the ULP offload engine 502 uses a specific set of bits in the ULP header that unambiguously identifies the situation. Specifically, the ULP offload engine 502 places (0, 1) in the most significant bits of the DataSegmentLength field. Further, even if some of the data from the corresponding PDU data was already placed directly, the iSCSI software in the host will notice the (0, 1) combination of bits, drop the entire iSCSI PDU and start iSCSI level recovery.

A system and method in accordance with the present invention may provide this and other mechanisms to handle all possible exceptions in presence of direct data placement. In one embodiment, the ULP offload engine 502 will explicitly indicate to the ULP software the amount of data placed directly. In one embodiment, the ULP offload engine 502 uses offloaded command context's extra field called partial-PDU-placed-bytes. This field remains zero in all interactions/scenarios except those when an exceptional TCP/IP or ULP level event happened in the middle of receiving a given ULP PDU. The non-zero value of the partial-PDU-placed-bytes field would mean that, despite the fact that the ULP header indicates otherwise, the corresponding number of bytes from a given PDU is placed directly.

In another embodiment, the ULP offload engine 502 always explicitly indicates to the ULP software both an offset and the amount of data directly placed into an offloaded command's buffers starting at this offset. In one embodiment, the ULP offload engine 502 uses extra fields within an offloaded command context to communicate this information to the ULP software. This provides for an additional flexibility for the ULP offload engine 502, in terms of starting and ending direct data placement for any given offloaded command. This also provides for another way for the ULP software to confirm amount of directly placed data, in addition to modified ULP headers.

In still another embodiment, the ULP offload engine 502 tracks TCP sequence number of the last iSCSI header for which all or some of the PDU data was placed directly, and simply detects any attempt to retransmit to the "left" of this (sequence number) value. If detected, the ULP offload engine 502 drops the packet and notifies host based iSCSI software of the connection-level error. As described herein, the transmit functional block 206 (FIG. 2) may provide local TCP receive window updates to the receive side 208 of the ULP offload engine, to facilitate additional check on the incoming TCP segments (FIG. 4, 410). Tracking a single additional sequence number (corresponding to the last iSCSI header for which all or some of the PDU data was placed directly) in the receive connection context is simultaneously simple and inexpensive, resource wise. Combined with a simple receive window tracking and the fact that, apart from being out of receive window, unanticipated drops by (native) host TCP stack—indicated by FIG. 8 "Any error" transition—must be extremely rare in nature, this provides for a very attractive cost/benefit ratio to achieve complete correctness of receive operation 506. In this particular embodiment, the ULP offload engine 502 would not be required to explicitly specify amounts of directly placed data, saving possibly on the cost of per offloaded command additional DMA transaction on the fast path.

In "TCP stream" state, a received Ethernet frame is delivered via non-offloaded L2 channel (denoted on FIG. 4 as "L2/LRO receive logic" functional block). When the receive connection context is in TCP stream state, the ULP offload engine 502 does not perform receive side offloads.

A system and method in accordance with the present invention may provide mechanisms for the ULP engine to transition the receive connection context back to ULP state. To make the transition back to ULP state, the ULP offload engine 502 uses the fact that ULP PDUs are to be received back to back in the incoming in-order TCP byte stream. In one embodiment, ULP offload engine 502 tracks ULP headers across TCP stream that may be temporarily out of order. This (tracking) is based on the fact that the next ULP header must be located exactly at a TCP sequence number defined by a combination of the previous PDU length and the previous header's sequence number. This observation requires the following to be true: the previous header must be valid (if header CRC is defined, the previous header could optionally be required to pass the header CRC check), and a TCP segment that contains the previous header may not necessarily be in-order but it must have a valid checksum. If the previous iSCSI header is spliced over two TCP segments, both segments' checksums must be valid.

In another embodiment, the ULP offload engine 502 providing iSCSI offload services runs a number of simple checks on a 48 bytes of TCP payload that immediately follows TCP header of a received TCP segment.

If one presumed ULP header has passed the ULP header validity check, the next ULP header is expected to be located at a TCP sequence number defined by the TCP sequence number of the current (presumed) ULP header and the current ULP packet length. To calculate the position of next expected ULP header in the TCP stream, the ULP offload engine 502 takes into consideration protocol specifics, including: possible padding of the ULP packets, presence of markers in the ULP packets, presence of CRC at the end of ULP headers and/or at the end of ULP packets, presence of ULP extension headers. A sequence of back-to-back ULP headers passing all the checks greatly increases the chances that the original assumption with regards to the position of the first ULP header in the sequence was indeed correct.

A system and method in accordance with the present invention may provide ULP-specific mechanisms to locate and confirm ULP headers in the TCP byte stream. In one embodiment, the ULP offload engine 502 providing iSCSI offload services employs NOP-IN/NOP-OUT. Once the host based iSCSI software notices transition to TCP stream state, it starts sending NOP-OUTs (Initiator) or NOP-INs (Target). For the Initiator, each NOP-OUT contains either a pre-configured payload, or a host iSCSI software runtime-defined payload that gets intercepted and stored by the ULP offload engine 502. For the Target, each NOP-IN either uses a pre-configured NOP-IN Target Transfer Tag (TTT), or a host iSCSI software defined TTT that also gets intercepted and stored by the ULP offload engine 502. In both cases, according to the iSCSI RFC 3720 specification, the remote iSCSI must respond echoing back the search pattern (Initiator) or TTT (Target). This echoed back search pattern or TTT is then used by the ULP offload engine 502 to identify the location of iSCSI header.

A system and method in accordance with the present invention may provide these and other mechanisms to support transition from TCP stream back to ULP state. In one embodiment, having identified a sequence of ULP packets in the incoming TCP stream, the ULP offload engine 502 communicates to the host based ULP software the position of ULP header, to confirm this position with the host based ULP software (see for instance CONFIRMING_ISCSI sub-state, FIG. 6, step 710). Once confirmed, the ULP offload engine 502 marks the corresponding receive connection context as ULP, thus finalizing the transition from TCP stream to ULP state.

In another embodiment, the TCP stream back to ULP transition is done completely autonomously by the ULP offload engine 502, without the need to execute CONFIRMING_ISCSI logic. This requires that both data and header digest on the corresponding connection to be negotiated and offloaded. This also requires that the ULP offload engine 502 runs a (configurable) number of back-to-back received iSCSI PDUs through a sequence of checks, including validating header and data CRC. In this embodiment, the (autonomous) TCP stream=>iSCSI transition is ultimately protected not only by the described sequence of checks and extremely low probabilities of missing iSCSI PDU boundaries while succeeding in all required CRC validations, but also by the fact that the Benign Header Modification performed not on the correctly selected bits of the iSCSI header will trigger bad-CRC exception in the host software, since, again, both header and data CRC would be required to be enabled.

A system and method in accordance with the present invention may provide mechanisms for the host based ULP software to confirm the position of ULP header in the TCP by stream. In one embodiment, both the ULP offload engine 502 and the host based ULP software independently from each other track the total TCP payload received in TCP stream state. In one embodiment, the ULP offload engine 502 communicates the calculated total TCP payload byte count to the host based ULP software, so that the latter compares it with the number it maintains itself for a given ULP connection, and based on the result of the comparison, either confirms the position of ULP header, or rejects it. The latter is denoted on the FIG. 6 as CONFIRMING_ISCSI sub-state, via step 710, and its transitions.

In still another embodiment, the ULP offload engine 502 communicates the ULP header position first to a network interface driver; the latter then supplements this information with an additional information that may include pointer to a specific area in host memory, pointer to the corresponding network packet with ULP data in it, and possibly other information that may be specific to a given host operating system and host based networking stack. The network interface driver then delivers this combined information to the host based ULP software; the latter uses this combined information to confirm the position of ULP header, and thus finalize the transition of the receive connection context from TCP stream to ULP.

On the transmit side, as opposed to conventional iSCSI HBAs, iSCSI software in the host prepares iSCSI PDUs for transmission. The operation of iSCSI software is closely similar to that of non-offloaded soft implementations, except that the former prepares "unfinished" iSCSI PDUs. From the ULP offload engine 502 perspective, there is a stream of host-transmitted TCP bytes carrying iSCSI payload in a strict byte sequence.

The ULP offload engine 502 maintains per ULP connection control structure (transmit connection context). This transmit functional block (FIG. 2, 206) may optionally be required to supply to the receive side of the engine local TCP receive window updates, to facilitate additional check on the incoming TCP segments (FIG. 4, 410).

In one embodiment, ULP offload engine 502 performs a simple classification to match an outgoing Ethernet frame with the transmit connection context, based on a TCP tuple (source port, source IP address, destination port, destination IP address). Similar to the receive side, the engine then uses a combination of the transmit connection context and the outgoing Ethernet frame(s) to identify the boundaries of ULP packets, to calculate and insert CRC into outgoing ("unfinished", FIG. 8) ULP packets. This process of calculating and inserting CRC into outgoing PDUs is also illustrated on FIG. 3 (for instance 306, 316).

In yet another embodiment, the network interface driver performs takes the responsibility to lookup of a transmit connection control structure that the driver maintains independently from the ULP offload engine 502. Once located, the driver uses this control structure to get an identifier of the transmit connection context maintained by the ULP offload engine 502. This latter identifier, which is opaque for the driver, is then communicated over to the ULP offload engine 502, along with the Ethernet frame, or frames—for the subsequent CRC calculation and insertion into outgoing ULP packets.

Figure 8A:
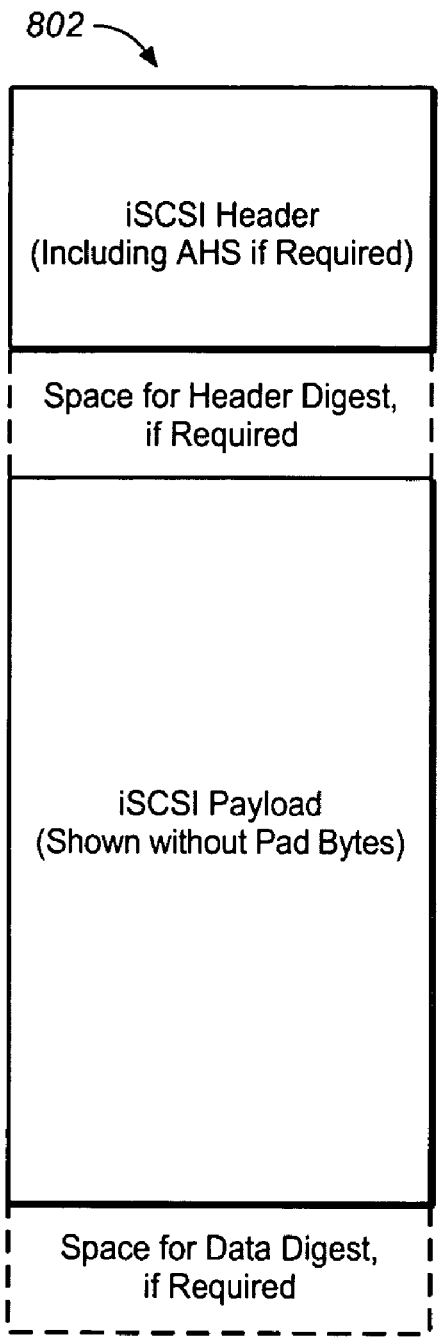
FIG. 8 illustrates two "unfinished" iSCSI PDU layouts on the transmit side
Figure 8B:
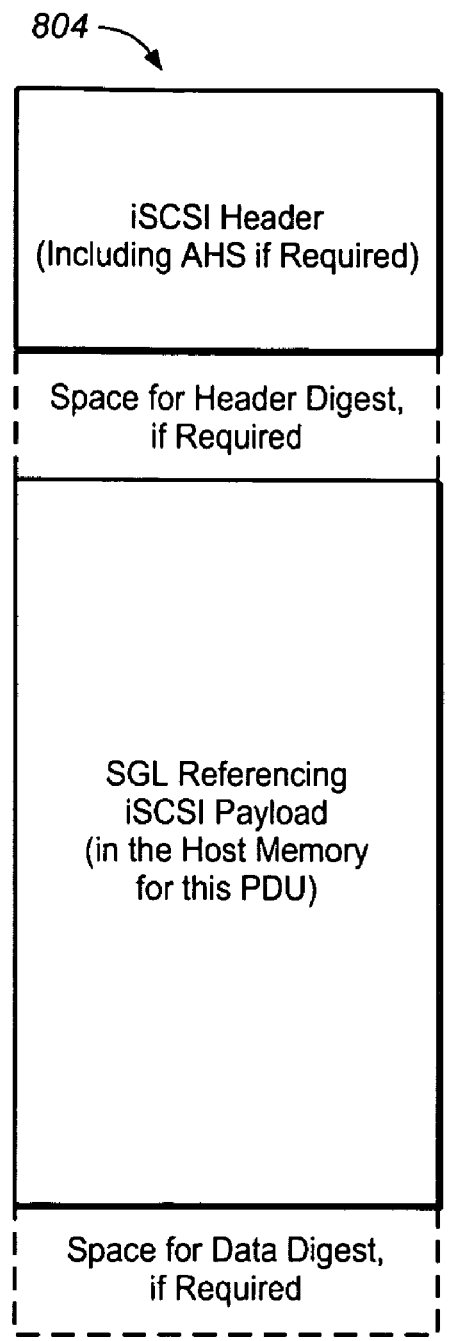

As noted, iSCSI software supplies a stream of "unfinished" iSCSI PDUs for transmission. Those PDUs require "finishing" by the ULP offload engine 502. Specifically, there are two possible layouts—two "unfinished" PDU layouts 802 and 804 (FIG. 8). In one embodiment, the ULP offload engine 502 expects to see "unfinished" iSCSI PDUs of the layout 802, with iSCSI payload inlined and present right there within the host transmitted TCP payload, as illustrated.

The layout 804 on FIG. 8 instead of actual data carries a part of the original SCSI scatter-gather list (SGL) posted for transmission. This may find custom applications on the Target side, where the SGL referenced data may not be readily accessible to iSCSI software and the native TCP stack. The major downside of this layout: retransmit complexity, which translates as a requirement for the transmit functional block to resolve TCP sequence number→SGL that references the corresponding payload, still present in the host.

On the transmit side, the ULP offload engine 502 provides additional services, specifically to take care of the TCP retransmit scenario 516. In one embodiment, ULP engine providing iSCSI offload services maintains retransmit history as a plain list of pairs: (TCP sequence number, calculated CRC32c value). When a local TCP stack retransmits, the ULP offload engine 502 registers this fact by comparing an outgoing sequence number with the last transmitted one. Next, the engine simply inserts saved CRC32c value(s) from the retransmit history at their corresponding sequence number (s). Cleanup of older retransmit history is driven by received TCP ACKs, in full compliance with TCP specification and requirements that in particular state that the acknowledged data cannot be requested for retransmit.

In another embodiment, when transmitting, the adapter deposits each outgoing Ethernet frame in a circular queue in the host memory. The queue is implemented as a circular buffer of the size enough to hold receiver-advertised receive window for a given connection. This approach requires extra PCI bandwidth and extra memory in the host, with a benefit of being absolutely generic—that is, usable with any changes that may happen to the data on the transmit side as a result of the transmit side offloads, which makes it not a preferable implementation. In general, handling a slow path by doubling bandwidth PCI requirement and at a host memory expense that cannot scale with the number of ULP connections is almost always (but not always) an inferior approach.

In one embodiment, the ULP offload engine 502 may be implemented in the hardware. The advantage of this is that the iSCSI offload services described herein can be provided on the receive side at line rate, that is, the rate bits are received from the network. On the transmit side, the hardware implementation ensures not to introduce extra latency while providing the iSCSI offload services described herein.

A system and method in accordance with the present invention may provide mechanisms wherein an existing host based iSCSI software can be reused with very little modifications to offload iSCSI processing in cooperation with the ULP offload engine 502. An embodiment of the present invention may apply equally to the iSCSI Initiator and the iSCSI Target.

Although the present invention has been described in accordance with the embodiments shown, one of ordinary skill in the art will readily recognize that there could be variations to the embodiments and those variations would be within the spirit and scope of the present invention. Accordingly, many modifications may be Trade by one of ordinary skill in the art without departing from the spirit and scope of the appended claims.

What is claimed is:

1. A method for offloading CPU and memory intensive operations from host to an advanced iSCSI capabilities network adapter, the method comprising:
    receiving a protocol data unit including a TCP protocol data unit (TCP segment);
    validating the protocol data unit;
    identifying a control structure (receive connection context) describing a combined TCP and iSCSI state of a receive side of an iSCSI connection; and
    utilizing the control structure and TCP segment information to perform iSCSI CPU and memory intensive processing, wherein the TCP state of the corresponding TCP connection is not owned by the adapter; wherein iSCSI receive side protocol offloads are executed prior to state modifying TCP processing, while maintaining RFC-specified iSCSI semantics and in accordance with iSCSI requirements.

2. The method of claim 1, wherein a TCP offload engine (TOE) is not utilized.

3. The method of claim 1, wherein the CPU intensive iSCSI CRC calculation is offloaded from the host and performed by the advanced iSCSI capabilities network adapter.

4. The method of claim 3, wherein host based iSCSI software can unambiguously identify, based on received iSCSI headers, whether header and data digests were calculated and verified (that is, offloaded) by the advanced iSCSI capabilities network adapter.

5. The method of claim 3, wherein iSCSI header and data digests are offloaded by an advanced iSCSI capabilities network adapter on the receive side of ULP connection when the receive connection context is in iSCSI state.

6. The method of claim 1, wherein advanced iSCSI capabilities network adapter performs direct data placement of iSCSI data into host memory.

7. The method of claim 6, wherein iSCSI header of a received iSCSI PDU is used to identify pre-posted application buffers and place iSCSI payload directly into those buffers in the host memory, where the data is ultimately expected by the application that uses iSCSI transport.

8. The method of claim 6, wherein host based iSCSI software can unambiguously identify, based on received iSCSI headers, whether iSCSI data was directly placed into the application buffers by the advanced iSCSI capabilities network adapter.

9. The method of claim 6, wherein advanced iSCSI capabilities network adapter performs direct data placement of iSCSI data into host memory when the receive connection context is in iSCSI state.

10. The method of claim 1, wherein the IP and TCP receive protocol processing is done only and exclusively by the host networking stack, which does not require modification to support the advanced iSCSI capabilities network adapter.

11. The method of claim 1, wherein Layer 2, 3 and 4 networking protocols processing on the receive side (including ICMP, ARP, Neighbor Discovery (IPv6)) is done only and exclusively by the host networking stack, which does not require modification to utilize the advanced iSCSI capabilities network adapter.

12. The method of claim 1, wherein TCP connection identifier including source IP, source port, destination IP, destination port from an incoming Ethernet frame, is used to locate the receive connection context that corresponds to a given iSCSI connection.

13. The method of claim 2, wherein received iSCSI protocol data units (PDUs) are delineated in an incoming TCP byte stream without TCP Offload Engine (TOE) being present in the advanced iSCSI capabilities network adapter.

14. The method of claim 1, wherein the advanced iSCSI capabilities network adapter modifies certain bits of the received iSCSI protocol data unit headers, to deliver control information to the host resident iSCSI software using host networking stack.

15. The method of claim 1, wherein the advanced iSCSI capabilities network adapter delivers all protocol control information in a form of protocol headers to the host networking stack, independently of whether iSCSI data was, or was not, directly placed.

16. The method of claim 1, wherein iSCSI receive processing is performed in presence of all possible TCP/IP and iSCSI level exceptions, including out of order TCP segment arrival, bad TCP checksum, bad IP checksum, fragmented IP datagrams, bad iSCSI header digest, bad iSCSI data digest, and others, while maintaining RFC-specified iSCSI semantics and in accordance with the iSCSI requirements.

17. The method of claim 1, wherein the receive connection context acts at any point during the connection lifetime in one of the following two states: TCP stream and iSCSI.

18. The method of claim 1, wherein advanced iSCSI capabilities network adapter automatically transitions the receive side of iSCSI connection into TCP stream state in presence of TCP/IP level exceptions such as out of order TCP segmented arrival, and others.

19. The method of claim 1, wherein advanced capabilities network adapter employs a plurality of algorithms to make the transition back from TCP stream state to iSCSI state.

20. The method of claim 19, wherein the transition from TCP stream state to iSCSI state is performed autonomously by the advanced iSCSI capabilities network adapter.

21. The method of claim 19, wherein the transition from TCP stream to iSCSI state is performed semi-autonomously by the advanced iSCSI capabilities network adapter, with a single message exchange between advanced iSCSI capabilities network adapter and host based iSCSI software.

22. The method of claim 19, wherein iSCSI NOP-In/NOP-Out PDUs are employed to locate iSCSI headers in the incoming TCP byte stream.

23. The method of claim 19, wherein the transition from TCP stream to iSCSI state is done at wire speed, without incurring extra latency and without extra buffering.

24. The method of claim 1, wherein pre-posted application buffers are retired by the advanced iSCSI capabilities network adapter autonomously, without the need to communicate to host based iSCSI software.

25. The method of claim 1, wherein pre-posted application buffers are retired by host based iSCSI software autonomously, without the need to communicate to the advanced iSCSI capabilities network adapter.

26. A method for offloading CPU intensive operations from host to an advanced iSCSI capabilities network adapter, the method comprising:
calculating and inserting iSCSI CRC in outgoing iSCSI protocol data units (PDUs); and
maintaining transmit history in terms of modifications performed on the outgoing iSCSI PDUs to facilitate TCP retransmit; wherein
the iSCSI transmit side protocol offloads are executed after the TCP transmit processing, while at the same time maintaining RFC-specified iSCSI semantics and in accordance with the iSCSI requirements.

27. The method of claim 26, wherein a TCP offload engine (TOE) is not utilized.

28. The method of claim 26, wherein the IP and TCP transmit protocol processing is done only and exclusively by the host networking stack, which does not require modification to utilize the advanced iSCSI capabilities network adapter.

29. The method of claim 26, wherein Layer 2, 3 and 4 networking protocols processing on the transmit side (including ICMP, ARP, Neighbor Discovery (IPv6)) is done only and exclusively by the host networking stack, which does not require modification to support the advanced iSCSI capabilities network adapter.

30. The method of claim 26, wherein advanced iSCSI capabilities network adapter finishes the unfinished iSCSI PDUs submitted by host based iSCSI software for transmission.

31. The method of claim 30, wherein the finishing of iSCSI PDUs includes:
identifying a control structure (transmit connection context) describing a combined TCP and iSCSI state of a transmit side of an iSCSI connection; utilizing the control structure and TCP segment information to perform iSCSI PDU delineation on the transmit side;
calculating iSCSI header digest and inserting it into outgoing iSCSI PDUs in accordance with iSCSI RPC 3720;
calculating iSCSI data digest and inserting it into outgoing PDUs in accordance with iSCSI RFC.

32. A system for offloading CPU and memory intensive operations from host to an advanced iSCSI capabilities network adapter, comprising:
an interface configured to receive a protocol data unit including a TCP protocol data unit (TCP segment);
one or more processors coupled to the interface, configured to:
validate the protocol data unit;
identify a control structure (receive connection context) describing a combined TCP and iSCSI state of a receive side of an iSCSI connection; and
utilize the control structure and TCP segment information to perform iSCSI CPU and memory intensive processing, wherein the TCP state of the corresponding TCP connection is not owned by the adapter; wherein iSCSI receive side protocol offloads are executed prior to state modifying TCP processing, while maintaining RFC-specified iSCSI semantics and in accordance with iSCSI requirements.

33. The system of claim 32, wherein a TCP offload engine (TOE) is not utilized.

34. The system of claim 32, wherein the CPU intensive iSCSI CRC calculation is offloaded from the host and performed by the advanced iSCSI capabilities network adapter.

35. The system of claim 34, wherein host based iSCSI software can unambiguously identify, based on received iSCSI headers, whether header and data digests were calculated and verified (that is, offloaded) by the advanced iSCSI capabilities network adapter.

36. The system of claim 34, wherein iSCSI header and data digests are offloaded by an advanced iSCSI capabilities network adapter on the receive side of ULP connection when the receive connection context is in iSCSI state.

37. The system of claim 32, wherein advanced iSCSI capabilities network adapter performs direct data placement of iSCSI data into host memory.

38. The system of claim 37, wherein iSCSI header of a received iSCSI PDU is used to identify pre-posted application buffers and place iSCSI payload directly into those buffers in the host memory, where the data is ultimately expected by the application that uses iSCSI transport.

39. The system of claim 37, wherein host based iSCSI software can unambiguously identify, based on received iSCSI headers, whether iSCSI data was directly placed into the application buffers by the advanced iSCSI capabilities network adapter.

40. The system of claim 37, wherein advanced iSCSI capabilities network adapter performs direct data placement of iSCSI data into host memory when the receive connection context is in iSCSI state.

41. The system of claim 32, wherein the IP and TCP receive protocol processing is done only and exclusively by the host networking stack, which does not require modification to support the advanced iSCSI capabilities network adapter.

42. The system of claim 32, wherein Layer 2, 3 and 4 networking protocols processing on the receive side (including ICMP, ARP, Neighbor Discovery (IPv6)) is done only and exclusively by the host networking stack, which does not require modification to utilize the advanced iSCSI capabilities network adapter.

43. The system of claim 32, wherein TCP connection identifier including source IP, source port, destination IP, destination port from an incoming Ethernet frame, is used to locate the receive connection context that corresponds to a given iSCSI connection.

44. The system of claim 32, wherein received iSCSI protocol data units (PDUs) are delineated in an incoming TCP byte stream without TCP Offload Engine (TOE) being present in the advanced iSCSI capabilities network adapter.

45. The system of claim 32, wherein the advanced iSCSI capabilities network adapter modifies certain bits of the received iSCSI protocol data unit headers, to deliver control information to the host resident iSCSI software using host networking stack.

46. The system of claim 32, wherein the advanced iSCSI capabilities network adapter delivers all protocol control information in a form of protocol headers to the host networking stack, independently of whether iSCSI data was, or was not, directly placed.

47. The system of claim 32, wherein iSCSI receive processing is performed in presence of all possible TCP/IP and iSCSI level exceptions, including out of order TCP segment arrival, bad TCP checksum, bad IP checksum, fragmented IP datagrams, bad iSCSI header digest, bad iSCSI data digest, and others, while maintaining RFC-specified iSCSI semantics and in accordance with the iSCSI requirements.

48. The system of claim 32, wherein the receive connection context acts at any point during the connection lifetime in one of the following two states: TCP stream and iSCSI.

49. The system of claim 32, wherein advanced iSCSI capabilities network adapter automatically transitions the receive side of iSCSI connection into TCP stream state in presence of TCP/IP level exceptions such as out of order TCP segmented arrival, and others.

50. The system of claim 32, wherein advanced capabilities network adapter employs a plurality of algorithms to make the transition back from TCP stream state to iSCSI state.

51. The system of claim 50, wherein the transition from TCP stream state to iSCSI state is performed autonomously by the advanced iSCSI capabilities network adapter.

52. The system of claim 50, wherein the transition from TCP stream to iSCSI state is performed semi-autonomously by the advanced iSCSI capabilities network adapter, with a single message exchange between advanced iSCSI capabilities network adapter and host based iSCSI software.

53. The system of claim 50, wherein iSCSI NOP-In/NOP-Out PDUs are employed to locate iSCSI headers in the incoming TCP byte stream.

54. The system of claim 50, wherein the transition from TCP stream to iSCSI state is done at wire speed, without incurring extra latency and without extra buffering.

55. The system of claim 32, wherein pre-posted application buffers are retired by the advanced iSCSI capabilities network adapter autonomously, without the need to communicate to host based iSCSI software.

56. The system of claim 32, wherein pre-posted application buffers are retired by host based iSCSI software autonomously, without the need to communicate to the advanced iSCSI capabilities network adapter.

57. A system for offloading CPU intensive operations from host to an advanced iSCSI capabilities network adapter, comprising:
one or more processors configured to:
calculate and insert iSCSI CRC in outgoing iSCSI protocol data units (PDUs); and
maintain transmit history in terms of modifications performed on the outgoing iSCSI PDUs to facilitate TCP retransmit; wherein
the iSCSI transmit side protocol offloads are executed after the TCP transmit processing, while at the same time maintaining RFC-specified iSCSI semantics and in accordance with the iSCSI requirements; and
one or more memories coupled to the one or more processors, configured to provide the one or more processors with instructions.

58. The system of claim 57, wherein a TCP offload engine (TOE) is not utilized.

59. The system of claim 57, wherein the IP and TCP transmit protocol processing is done only and exclusively by the host networking stack, which does not require modification to utilize the advanced iSCSI capabilities network adapter.

60. The system of claim 57, wherein Layer 2, 3 and 4 networking protocols processing on the transmit side (including ICMP, ARP, Neighbor Discovery (IPv6)) is done only and exclusively by the host networking stack, which does not require modification to support the advanced iSCSI capabilities network adapter.

61. The system of claim 57, wherein advanced iSCSI capabilities network adapter finishes the unfinished iSCSI PDUs submitted by host based iSCSI software for transmission.

62. The system of claim 61, wherein the finishing of iSCSI PDUs includes:
  identifying a control structure (transmit connection context) describing a combined TCP and iSCSI state of a transmit side of an iSCSI connection; utilizing the control structure and TCP segment information to perform iSCSI PDU delineation on the transmit side;
  calculating iSCSI header digest and inserting it into outgoing iSCSI PDUs in accordance with iSCSI RPC 3720;
  calculating iSCSI data digest and inserting it into outgoing PDUs in accordance with iSCSI RFC.

* * * * *